United States Patent

Inagaki et al.

[11] Patent Number: 6,137,616
[45] Date of Patent: Oct. 24, 2000

[54] MULTI-BEAM OPTICAL SCANNING DEVICE

[75] Inventors: Yoshihiro Inagaki; Akiyoshi Hamada; Toshio Naiki, all of Toyokawa, Japan

[73] Assignee: Minolta Co., Ltd., Osaka, Japan

[21] Appl. No.: 09/351,886

[22] Filed: Jul. 13, 1999

Related U.S. Application Data

[63] Continuation-in-part of application No. 09/052,029, Mar. 31, 1998, abandoned.

[30] Foreign Application Priority Data

Apr. 3, 1997 [JP] Japan .................................. 9-084797

[51] Int. Cl.$^7$ ................................................... G02B 26/08
[52] U.S. Cl. .......................... 359/204; 359/196; 359/197; 359/206; 359/216; 358/474; 358/494; 358/493; 347/233; 347/225; 347/238
[58] Field of Search ...................................... 359/204, 196, 359/197, 216, 217, 218, 206; 358/474, 494, 493; 347/233, 225, 238

[56] References Cited

U.S. PATENT DOCUMENTS 6,049,408  4/2000  Tada ........................................ 359/204

FOREIGN PATENT DOCUMENTS 06250105A  9/1994  Japan .

*Primary Examiner*—Cassandra Spyrou
*Assistant Examiner*—Leo Boutsikaris
*Attorney, Agent, or Firm*—Morrison & Foerster LLP

[57] ABSTRACT

A multi-beam optical scanning device capable of suppressing jitter at the image edges within allowable tolerance by satisfying the following equation:

$$\left(r - \sqrt{r^2 - \frac{D^2}{4}}\right)\tan\alpha < 0.005$$

Where r represents the radius of photosensitive member (mm); α represents the maximum value of the angle obtained by subtracting the angle formed by the light beam and the scanned line on the surface of the photosensitive member from 90 degrees; D represents the distance (mm) on the surface of the photosensitive member between the light beam condensing position on the furthermost upstream side and the condensing position on the furthermost downstream side in the direction of rotation of the photosensitive member.

15 Claims, 6 Drawing Sheets

MULTI-BEAM OPTICAL SCANNING DEVICE

This application is a continuation-in-part of Ser. No. 09/052,029 filed Mar. 31, 1998 abandoned.

FIELD OF THE INVENTION

The present invention relates to a multi-beam optical scanning device, and more specifically relates to a multi-beam optical scanning device using a plurality of light beams to form a two-dimensional image on the surface of a photosensitive member for a plurality of lines in a single scan.

BACKGROUND OF THE INVENTION

Conventionally, in the field of copiers and printers, various light beam scanning devices have been provided as means to write an image on an electrophotographic photosensitive member. Among these, an optical device of a multiple beam type has been developed to write an image of a plurality of lines in a single scan by simultaneously emitting a plurality of beams and deflecting each beam so as to scan adjacently with predetermined spacing in a subscan direction to improve image density and improve image writing speed.

This type of optical device is constructed to form an image using a plurality of light beams such as disclosed in Japanese Laid-Open Patent Application No. 6-250105 which describes art to equalize beam spacing in a subscan direction by arrangement of the light source.

In conventional multi-beam type optical devices, however, a disadvantage arises insofar as jitters occur at the image edges (i.e., edges on the upstream side and downstream side of the scan) even with accurate beam spacing in the subscan direction.

That is, when light beams B1 and B2 irradiate the surface of a photosensitive drum 27 at predetermined spacing in the subscan direction, as shown in FIGS. 7(A) and (B), the B2 which is supposed to irradiate a point A1 actually irradiates a point A2 at the image edges based on the curvature of the photosensitive drum 27 such that the main scan magnification changes and results in jitter G.

SUMMARY OF THE INVENTION

One objective of the present invention is to eliminate the aforesaid disadvantages by providing an improved multi-beam optical scanning device.

Another feature of the present invention is to provide a multi-beam optical scanning device capable of suppressing jitter at the image edges within allowable tolerance values.

These objectives and features are attained by providing a multi-beam optical scanning device comprising:

a light source section capable of emitting at least three light beams;

a photosensitive member having a cylindrical configuration and rotatable about a center axis; and a deflecting/scanning optical system to condense said plurality of respective light beams at slightly different positions in the direction of rotation on the surface of said photosensitive member, and to deflect said plurality of respective condensed light beams so as to scan the surface of said photosensitive member in a direction perpendicular to the direction of rotation of said photosensitive member;

wherein the following equation is satisfied:

$$\left(r - \sqrt{r^2 - \frac{D^2}{4}}\right)\tan\alpha < 0.005$$

Where r represents the radius of the photosensitive member (mm); α represents the maximum value of the angle obtained by subtracting the angle formed by the light beam and the scanned line on the surface of the photosensitive member from 90 degrees; D represents the distance (mm) on the surface of the photosensitive member between the light beam condensing position on the furthermost upstream side and the condensing position on the furthermost downstream side in the direction of rotation of the photosensitive member.

In the present invention, the radius of the photosensitive member is determined in accordance with the incident angle (i.e., equivalent to the angle α in the aforesaid equation) of the light beam relative to the scanned line on the surface of the photosensitive member at the image edges (i.e., the edges on the upstream side and the downstream side in the main scan direction). The amount of variation in the main scan magnification of each light beam is minimized by satisfying the aforesaid conditional equation, so as to suppress jitter occurring at the image edges to within an allowable tolerance (i.e., 0.005 mm in the aforesaid equation).

In this multi-beam optical scanning device, the light source section may comprise a plurality of laser diodes corresponding to said plurality of light beams, or a single surface emitting laser diode. When the light source section comprises a plurality of laser diodes corresponding to the plurality of light beams, the deflecting/scanning optical system desirably includes a beam splitter to collimate or converge the light beams emitted from each laser diode via transmission or reflection.

The deflecting/scanning optical system includes a deflecting device to deflect the plurality of light beams. A polygonal mirror, galvano mirror, or non-mechanical deflecting device having an acoustooptic effect may be used as the aforesaid deflecting device.

The deflecting/scanning optical system includes a plurality of fθ lenses arranged on the optical axes of the light beams between said deflecting device and said photosensitive member.

The plurality of light beams may number 8 or 16 beams, although other numbers of light beams may be used. When the light source section emits 8 beams, the deflecting/scanning optical system is arranged so as to provide an empty two lines between light beams in the subscan direction. When the light source section emits 16 beams, the deflecting/scanning optical system is arranged so as to provide an empty two-lines between light beams or no empty space between light beams in the subscan direction.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Preferred embodiments of the present invention are described hereinafter with reference to the accompanying drawings.

Optical Device, First Embodiment

Figure 1:
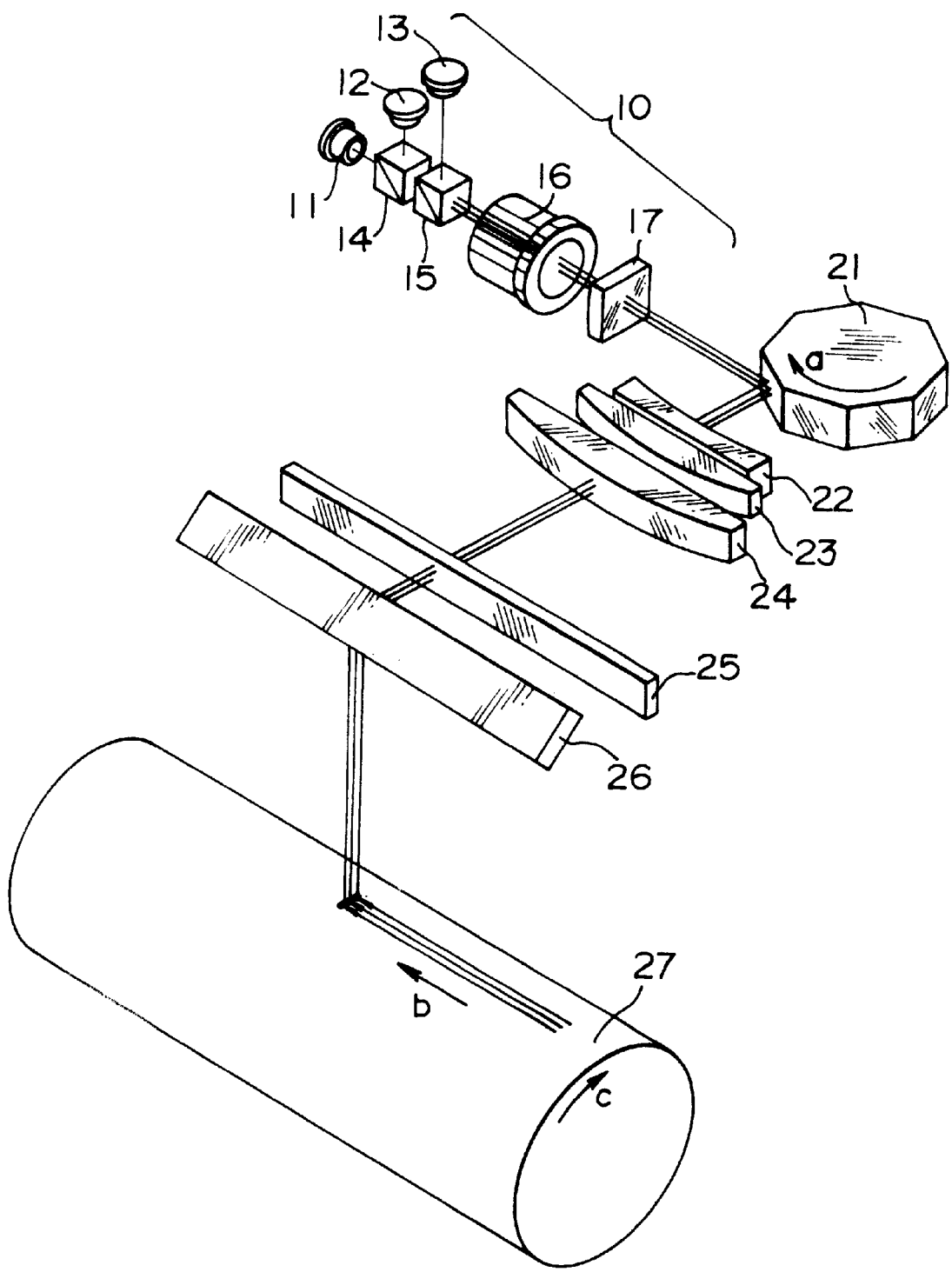
FIG. 1 is a perspective view of the construction of a multi-beam optical scanning device of a first embodiment of the present invention.

FIG. 1 shows the construction of a multi-beam optical scanning device of a first embodiment of the present invention. This multi-beam optical scanning device comprises a light source block 10, polygonal mirror 21, three fθ lenses 22, 23, 24, cylindrical lens 25, plane mirror 26, and photosensitive drum 27.

Light source block 10 comprises laser diodes 11, 12, and 13 to emit light beams, beam splitters 14 and 15, collimator lens 16, and cylindrical lens 17. The light beams emitted from laser diodes 11, 12, and 13 accomplish rectilinear propagation via transmission or reflection of beam splitters 14 and 15, and are collimated by collimator lens 16 as parallel rays (or convergent rays), and arrive at polygonal mirror 21 via cylindrical lens 17. The light beams are coupled by beam splitters 14 and 15 in a state proximity with minute spacing therebetween in the subscan direction. Cylindrical lens 17 focuses the light beam in a long line in the main scan direction in the vicinity of the reflective surface of polygonal mirror 21.

Polygonal mirror 21 is driven in rotation in the arrow a direction at predetermined speed. A light beam is deflected by the reflective surfaces at equi-angular speed based on the rotation of polygonal mirror 21, is subsequently transmitted through fθ lenses 22, 23, 24, and cylindrical lens 25, and is then reflected downward by plane mirror 26. Thereafter, the light beam forms an image on the surface of photosensitive drum 27 as it scans in the arrow b direction.

The fθ lenses 22, 23, 24 have correction functions (i.e., distortion correction) to correct the scanning speed of the light beam deflected at equi-angular speed by polygonal mirror 21 to a uniform main scan speed on the surface of photosensitive drum 27. Cylindrical lens 25 has optical power only in the subscan direction in the same manner as cylindrical lens 17, and the two cylindrical lenses 17 and 25 work in concert to accomplish planar aberration correction of the reflecting surfaces of polygonal mirror 21.

Photosensitive drum 27 is driven in rotation at constant speed in the arrow c direction, an image (electrostatic latent image) is formed on the surface of photosensitive drum 27 by a main scan in the arrow b direction via polygonal mirror 21 and fθ lenses 22, 23, 24, and a subscan in the arrow c direction via the rotation of the photosensitive drum 27.

Although three light beams are shown in FIG. 1 being written simultaneously, actually multi-beam image formation using 8 beams or 16 beams is described below. Of course, it is also possible to use three beams.

Optical Device, Second Embodiment

Figure 2:
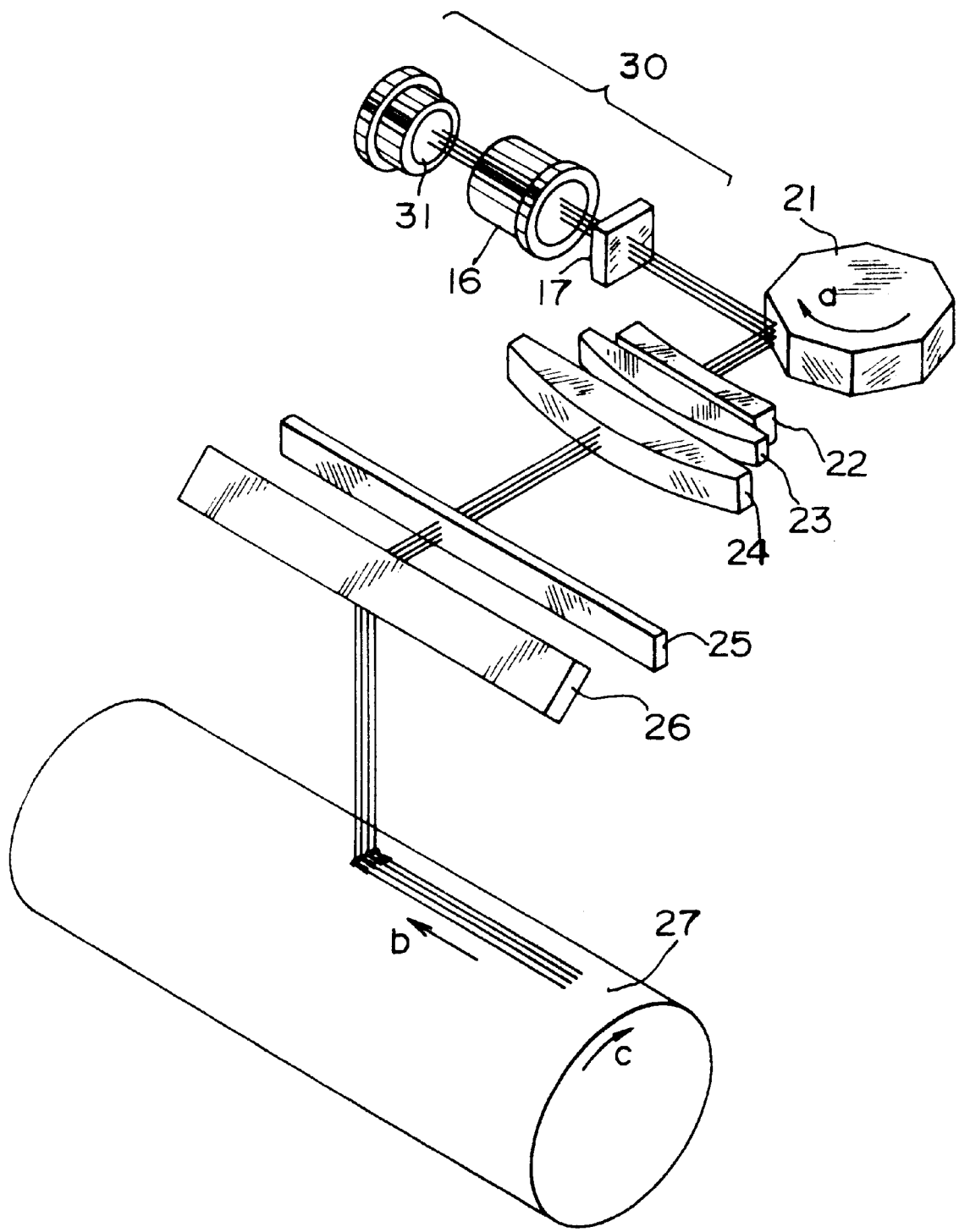
FIG. 2 is a perspective view of the construction of a multi-beam optical scanning device of a second embodiment of the present invention.

FIG. 2 shows the construction of a multi-beam optical scanning device of a second embodiment of the present invention. Since this optical device uses a surface emitting laser diode 31 in light source block 30, beam splitters are unnecessary, and otherwise this optical device is constructed identically to the optical device of FIG. 1. Although FIG. 2 shows image formation using four beams simultaneously for the convenience of illustration, image formation can actually be accomplished using 8 beams or 16 beams. Of course, it is also possible to use four beams.

Multi-beam Image Formation

Figure 3:
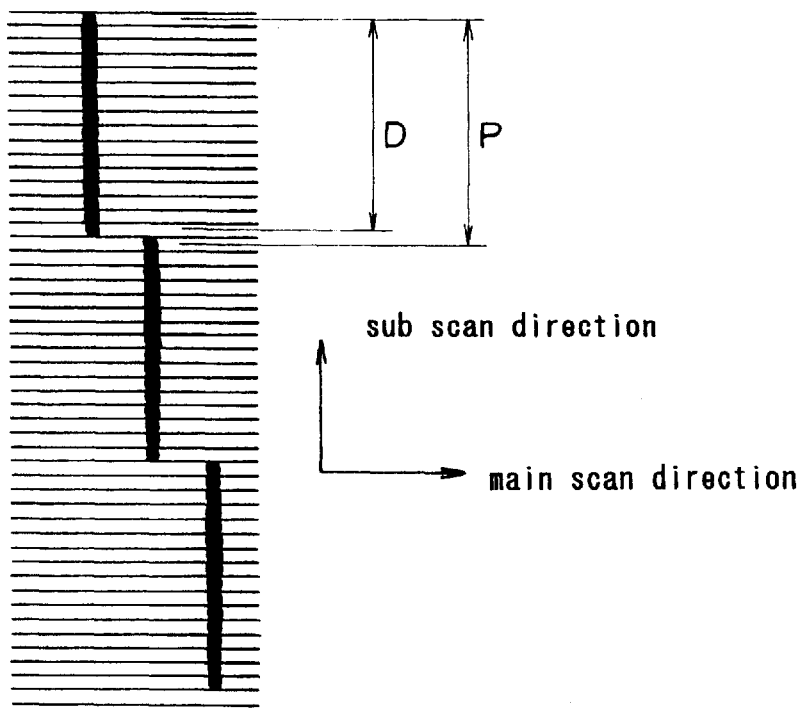
FIG. 3 illustrates the image writing state in 16-beam non-skip scanning.
Figure 4:
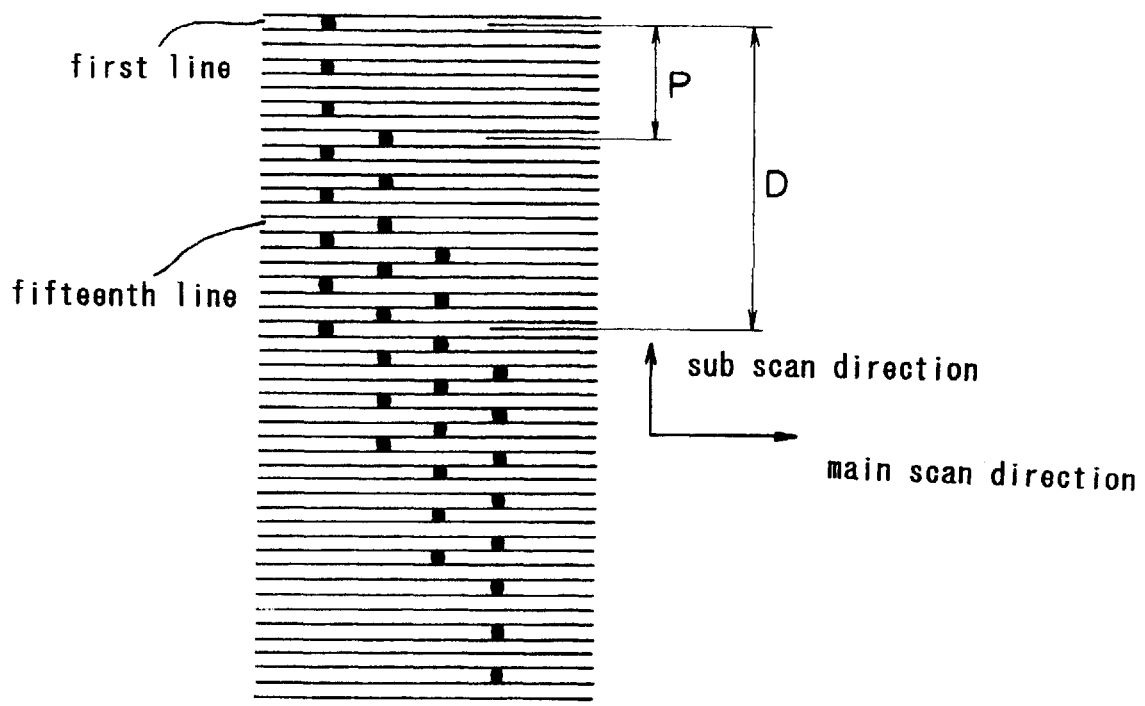
FIG. 4 illustrates the image writing state in 8-beam 2-line skip scanning.
Figure 5:
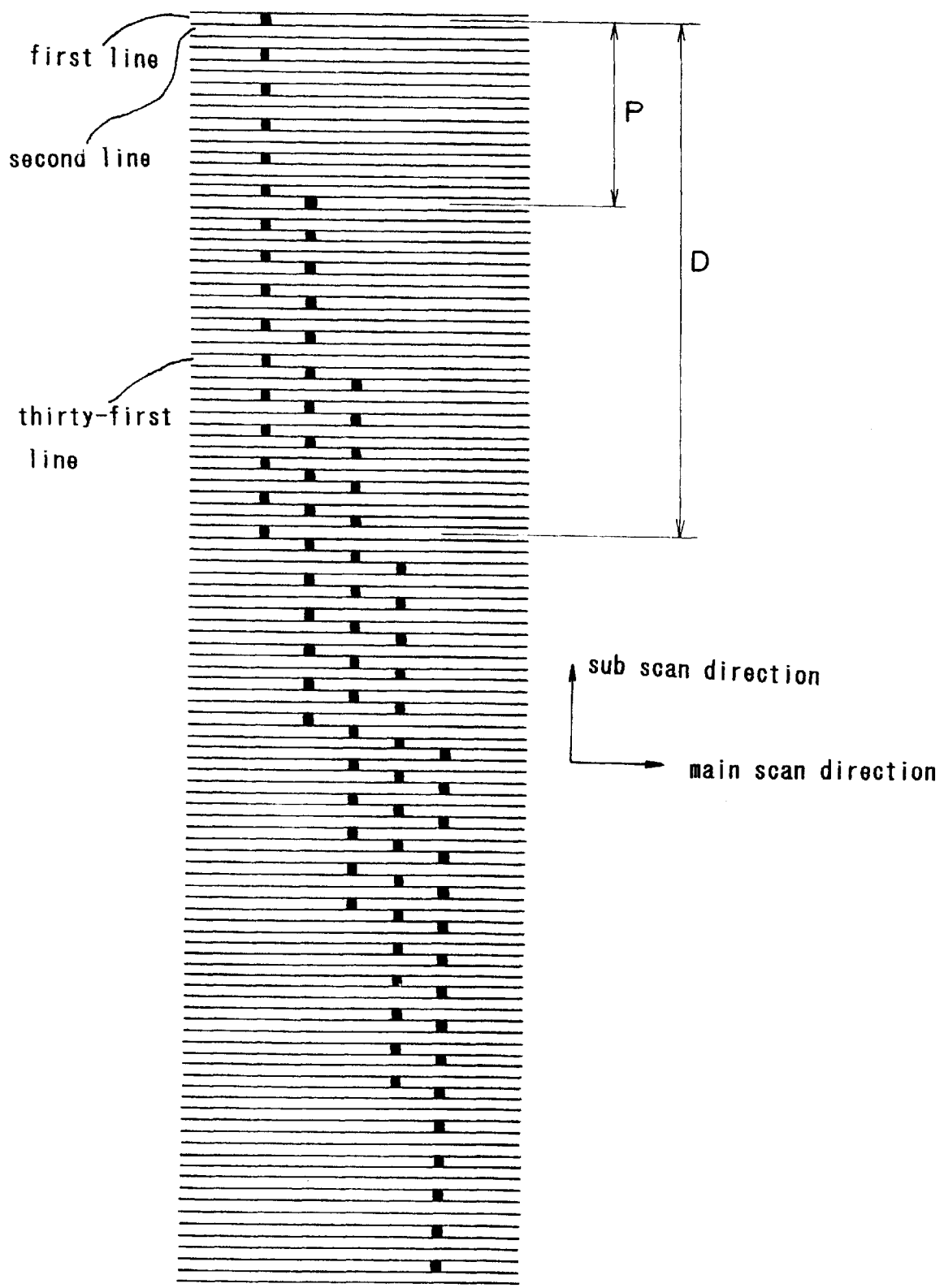
FIG. 5 illustrates the image writing state in 16-beam 2-line skip scanning.

Modes of forming an image on the surface of a photosensitive drum using multiple beams include, for example, a mode scanning with 16 beams, wherein each beam is arranged so as to provide no empty space between each beam in the subscan direction, the 16 beams are controlled simultaneously so as to be turned ON and OFF, and the photosensitive member is moved at pitch P for one scan, as shown in FIG. 3. This mode is referred to as the 16-beam non-skip scanning mode. In the case of 8-beam scanning, each beam is arranged so as to provide a space of two lines between each beam in the subscan direction, and moving the photosensitive member at pitch P for one scan, as shown in FIG. 4. This scanning mode is referred to as the 8-beam two-line skip scanning mode. In this instance, an image is written from the fifteenth line. When scanning with 16 beams, each beam is arranged so as to provide a space of two lines between each beam in the subscan direction, and the photosensitive drum is moved at pitch P for one scan, as shown in FIG. 5. This scanning mode is referred to as the 16-beam two-line skip scanning mode. In this instance, an image is written from the thirty-first line.

Jitter Occurrence and Jitter Suppression

Figure 7:
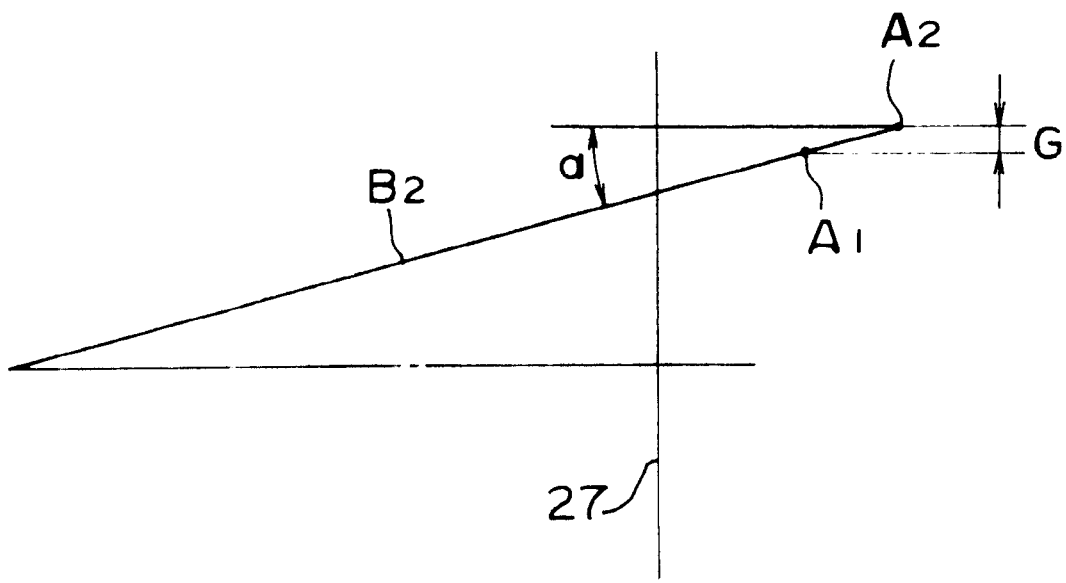
FIG. 7(A) and FIG. 7(B) illustrate the occurrence of jitter when using the multi-beam method.
Figure 7:
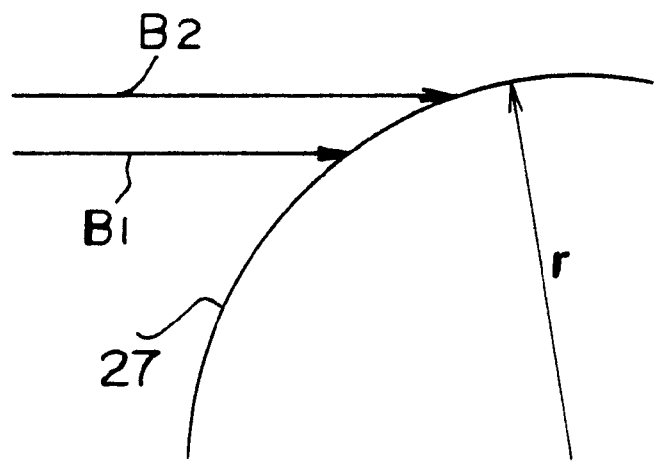

In multi-beam scanning, jitter G is generated in conjunction with the curvature of the photosensitive drum 27, as illustrated in FIGS. 7(A) and (B). We have determined that jitter G can be determined by the equation below.

$$\left(r - \sqrt{r^2 - \frac{D^2}{4}}\right)\tan\alpha = G$$

In this equation, r represents the radius of the photosensitive drum, and α represents the maximum value of the angle obtained by subtracting the angle formed by the light beam and the scanned line on the surface of the photosensitive drum within the image region from 90 degrees (refer to FIG. 7(A)). Also in the equation, D represents the distance on the surface of the photosensitive drum between the light beam condensing position on the furthermost upstream side and the condensing position on the furthermost downstream side in the direction of rotation of the photosensitive drum (refer to FIGS. 3, 4, 5).

Jitter has an allowable tolerance of about 5 μm in actual practice. Accordingly, jitter can be suppressed to below the allowed tolerance level by setting the radius r of the photosensitive drum such that the value of the equation does not exceed 5 μm.

Figure 6:
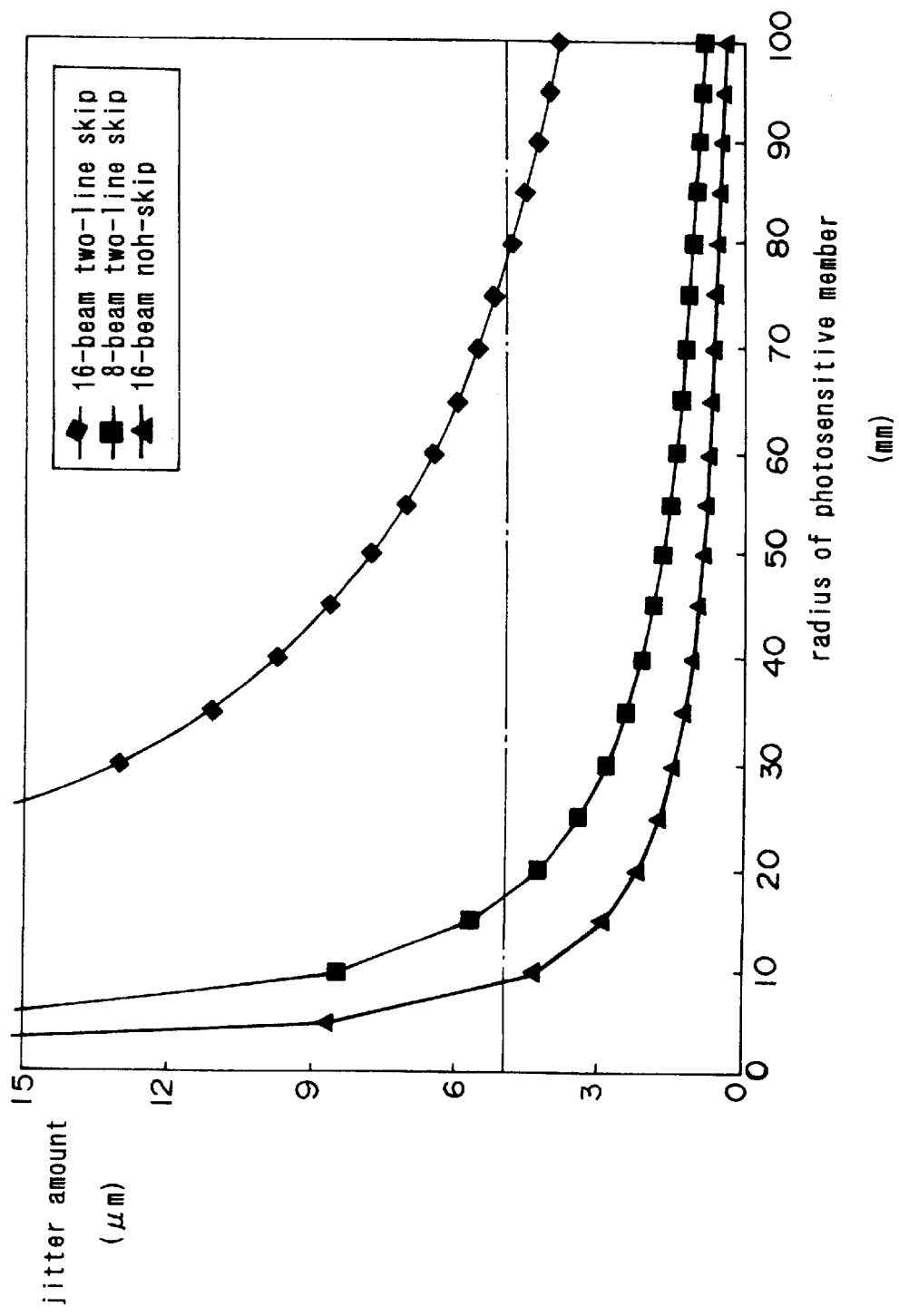
FIG. 6 is a graph showing the amount of jitter in relation to the radius of the photosensitive member.

FIG. 6 is a graph showing the amount of jitter relative to the radius of the photosensitive member in the three writing modes. Maximum beam angle α is 20.9°. Distance D can be uniformly calculated by the desired image density and the previously mentioned type of multi-beam mode; Specific calculations are provided below.

D=(25.4/image density [dpi])×(number of beams−1)× (number of skips+1)

Examples of values for distance D determined by the aforesaid calculation are given below in Table 1.

TABLE 1

| Image density | Mode | 16-beam two-line skip scan | 8-beam two-line skip scan | 16-beam non-skip scan |
|---|---|---|---|---|
| 400 dpi | | 1.91 | 0.89 | 0.64 |
| 600 dpi | | 2.86 | 1.33 | 0.95 |

(units: mm)

Table 2 shows the minimum radius of the photosensitive member for the aforesaid three scanning modes and image densities.

TABLE 2

| Image density | Mode | 16-beam two-line skip scan | 8-beam two-line skip scan | 16-beam non-skip scan |
|---|---|---|---|---|
| 400 dpi | | 78.0 | 17.0 | 8.7 |
| 600 dpi | | 34.7 | 7.6 | 3.9 |

(units: mm)

Although the present invention has been fully described in connection with the preferred embodiments thereof with reference to the accompanying drawings, it is to be noted that various changes and modification will be apparent to those skilled in the art. Such changes and modifications are to be understood as being included within the scope of the present invention as defined by the appended claims unless they depart therefrom.

In particular, it is to be noted that the number of beams used is optional insofar as three or more beams are used. Furthermore, a non-mechanical deflecting device having an acoustooptic effect may be substituted for the polygonal mirror or galvano mirror as deflecting devices.

What is claimed is:

1. A multi-beam optical scanning device comprising:
    a light source section capable of emitting a plurality of light beams;
    a photosensitive member having a cylindrical configuration and rotatable about a center axis; and
    a deflecting/scanning optical system for condensing said plurality of respective light beams at slightly different positions in the direction of rotation on the surface of said photosensitive member, and deflect said plurality of respective condensed light beams so as to scan the surface of said photosensitive member in a direction perpendicular to the direction of rotation of said photosensitive member;
    wherein the following equation is satisfied:

$$\left(r - \sqrt{r^2 - \frac{D^2}{4}}\right)\tan\alpha < 0.005$$

Where r represents the radius of the photosensitive member (mm); α represents the maximum value of the angle obtained by subtracting the angle formed by the light beam and the scanned line on the surface of said photosensitive member from 90 degrees; D represents the distance (mm) on the surface of the photosensitive member between the light beam condensing position on the furthermost upstream side and the condensing position on the furthermost downstream side in the direction of rotation of the photosensitive member.

2. A multi-beam optical scanning device as claimed in claim 1, wherein said plurality of light beams is at least three beams.

3. A multi-beam optical scanning device as claimed in claim 2, wherein said light source section comprises a plurality of laser diodes corresponding to said plurality of light beams.

4. A multi-beam optical scanning device as claimed in claim 3, wherein said deflecting/scanning optical system includes a beam splitter for collimating or converging light beams emitted from each said laser diode via transmission or reflection.

5. A multi-beam optical scanning device as claimed in claim 2, wherein said light source section comprises a single surface emitting laser diode.

6. A multi-beam optical scanning device as claimed in claim 2, wherein said deflecting/scanning optical system includes a deflecting device for deflecting said plurality of light beams.

7. A multi-beam optical scanning device as claimed in claim 6, wherein said deflecting device is a polygonal mirror.

8. A multi-beam optical scanning device as claimed in claim 6, wherein said deflecting device is a galvano mirror.

9. A multi-beam optical scanning device as claimed in claim 6, wherein said deflecting device is a non-mechanical deflecting device having an acoustooptic effect.

10. A multi-beam optical scanning device as claimed in claim 2, wherein said deflecting/scanning optical system further comprises a plurality of fθ lenses arranged on the optical axis of said light beams between said deflecting device and said photosensitive member.

11. A multi-beam optical scanning device as claimed in claim 2, wherein said plurality of light beams is 8 beams.

12. A multi-beam optical scanning device as claimed in claim 11, wherein said deflecting/scanning optical system is arranged so as to provide an empty two lines between light beams in the subscan direction.

13. A multi-beam optical scanning device as claimed in claim 2, wherein said plurality of light beams is 16 beams.

14. A multi-beam optical scanning device as claimed in claim 13, wherein said deflecting/scanning optical system is arranged so as to provide an empty two-lines between light beams in the subscan direction.

15. A multi-beam optical scanning device as claimed in claim 13, wherein said deflecting/scanning optical system is arranged so as to provide no empty space between light beams in the subscan direction.

* * * * *